United States Patent
Mate et al.

(10) Patent No.: US 10,743,127 B2
(45) Date of Patent: Aug. 11, 2020

(54) APPARATUS AND ASSOCIATED METHODS FOR PRESENTATION OF AUGMENTED REALITY CONTENT

(71) Applicant: Nokia Technologies Oy, Espoo (FI)

(72) Inventors: Sujeet Shyamsundar Mate, Tampere (FI); Miikka Vilermo, Siuro (FI); Lasse Laaksonen, Tampere (FI); Arto Lehtiniemi, Lempäälä (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/202,633

(22) Filed: Nov. 28, 2018

(65) Prior Publication Data
US 2019/0182613 A1    Jun. 13, 2019

(30) Foreign Application Priority Data

Dec. 7, 2017    (EP) ..................... 17205784

(51) Int. Cl.
| | |
|---|---|
| H04S 7/00 | (2006.01) |
| G06F 16/68 | (2019.01) |
| G06K 9/00 | (2006.01) |
| G06F 3/16 | (2006.01) |
| G01C 21/36 | (2006.01) |
| H04W 4/021 | (2018.01) |
| G06T 11/60 | (2006.01) |
| H04S 3/00 | (2006.01) |

(52) U.S. Cl.
CPC ............ *H04S 7/304* (2013.01); *G01C 21/365* (2013.01); *G01C 21/3629* (2013.01); *G06F 3/167* (2013.01); *G06F 16/68* (2019.01); *G06K 9/00671* (2013.01); *G06T 11/60* (2013.01); *H04S 3/008* (2013.01); *H04S 7/30* (2013.01); *H04W 4/021* (2013.01);
(Continued)

(58) Field of Classification Search
None
See application file for complete search history.

(56) References Cited

U.S. PATENT DOCUMENTS

| | | | |
|---|---|---|---|
| 7,394,906 B2 | 7/2008 | Jun | |
| 9,652,124 B2 * | 5/2017 | Cotier ................ | G06F 16/9537 |

(Continued)

FOREIGN PATENT DOCUMENTS

WO    01/55833 A1    8/2001

OTHER PUBLICATIONS

Mokey, Stephen, Alexander Nalbandian, and Brian O'Keefe. "Location as interaction: exploring blended spaces in the global village." Proceedings of the 27th International BCS Human Computer Interaction Conference. British Computer Society, 2013.*

(Continued)

*Primary Examiner* — Ryan M Gray
(74) *Attorney, Agent, or Firm* — Alston & Bird LLP (57) ABSTRACT

A system, apparatus and method are provided for updating spatial audio content in augmented reality based on a real-world speed and/or location of a consumer of the content. A moving spatial audio location may change location with time during a predetermining running time of the content. The spatial audio content is perceived as originating from a spatial audio location. Depending on the movement of the consumer, and a predicted alignment-time with of a point-of-interest and corresponding spatial audio content, a spatial audio location may be moved such that the spatial audio content aligns the point-of-interest based on an updated location of the consumer.

18 Claims, 6 Drawing Sheets

(52) U.S. Cl.
CPC ....... *H04S 2400/01* (2013.01); *H04S 2400/11* (2013.01); *H04S 2420/01* (2013.01)

(56) References Cited

U.S. PATENT DOCUMENTS

| | | | |
|---|---|---|---|
| 2011/0164044 A1 | 7/2011 | Huang | |
| 2014/0019037 A1* | 1/2014 | Christensen | G01C 21/00 |
| | | | 701/409 |
| 2014/0079225 A1* | 3/2014 | Jarske | H04R 29/00 |
| | | | 381/56 |
| 2015/0283902 A1 | 10/2015 | Tuukkanen | |
| 2015/0302645 A1* | 10/2015 | Takeuchi | G01C 21/3602 |
| | | | 345/633 |
| 2017/0295446 A1 | 10/2017 | Thagadur Shivappa | |
| 2017/0318407 A1* | 11/2017 | Meister | H04S 7/303 |
| 2018/0024362 A1* | 1/2018 | Williamson | G02B 27/017 |
| | | | 345/428 |
| 2018/0046431 A1* | 2/2018 | Thagadur Shivappa | |
| | | | H04S 7/304 |
| 2018/0352360 A1* | 12/2018 | Chen | H04S 7/303 |
| 2019/0045318 A1* | 2/2019 | Brettle | G06F 3/167 |

OTHER PUBLICATIONS

Extended European Search Report received for corresponding European Patent Application No. 17205784.6, dated May 14, 2018, 9 pages.

* cited by examiner

1101: based on (i) augmented reality content comprising at least spatial audio content and having a predetermined running time, said spatial audio content defining a spatial audio arrangement comprising at least one spatial audio object location, the or each spatial audio object location defining, at least in part, the configuration of the application of a spatial audio effect to be applied to said spatial audio content such that, when presented to a consumer of said augmented reality content, said spatial audio content is perceived as originating from said spatial audio location, (ii) a predetermined, real-world geographic location associated with at least one of said spatial audio location and said spatial audio arrangement; and (iii) a determined real-world speed of said consumer;

1102: providing for starting of the presentation of said augmented reality content 1102 based on a determination that the consumer has reached a start-location, said start-location comprising a location defined such that by starting said presentation at the start-location and following said predetermined running time with the consumer travelling at said determined real-world speed, the consumer is predicted to be at a determined end-location based on said predetermined, real-world geographic location.

Figure 12

1200

APPARATUS AND ASSOCIATED METHODS FOR PRESENTATION OF AUGMENTED REALITY CONTENT

TECHNICAL FIELD

The present disclosure relates to the field of presentation of augmented and mixed reality. In particular, it is related to the presentation of audio content of augmented reality content, associated apparatus, methods and computer programs.

BACKGROUND

Augmented reality may have the potential to effectively provide information to consumers about the real-world environment in which they are present. Augmented reality content may be experienced by consumers who are moving, such as travelling to a destination along a route. The augmented reality content may be configured to be experienced while the consumer is travelling along a route. However, when the user is moving and subject to potentially varying path conditions, the presentation of augmented reality content, which includes content that should be presented from particular directions, may be difficult.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a further aspect there is provided an apparatus, the apparatus comprising means configured to;
based on
(i) augmented reality content comprising at least spatial audio content and having a predetermined running time, said spatial audio content defining a spatial audio arrangement comprising at least one spatial audio object location, the or each spatial audio object location defining, at least in part, the configuration of the application of a spatial audio effect to be applied to said spatial audio content such that, when presented to a consumer of said augmented reality content, said spatial audio content is perceived as originating from said at least one spatial audio location,
(ii) a predetermined, real-world geographic location associated with at least one of said spatial audio location and said spatial audio arrangement; and
(iii) a determined real-world speed of said consumer;
provide for starting of the presentation of said augmented reality content based on a determination that the consumer has reached a start-location, said start-location comprising a location defined such that by starting said presentation at the start-location and with the consumer travelling at said determined real-world speed for the predetermined running time, the consumer is predicted to be at a determined end-location based on said predetermined, real-world geographic location.

In one or more examples, said determined end location comprises a location based on said real-world geographic location and said determined real-world speed.

In one or more examples, said spatial audio arrangement comprises at least a two-dimensional region having a boundary, said start-location and said end-location located on said boundary, wherein the determination of the location of the start-location provides for scaling of the size of at least one dimension of the spatial audio arrangement by a factor based on the determined speed and said predetermined running time.

In one or more examples, the starting of the presentation of said augmented reality is based on determination of the occurrence of a boundary traversal event comprising when said consumer enters said region at said start-location from outside said region.

In one or more examples, the apparatus, based on map data defining predetermined paths on which the consumer is expected to travel from the start-location to the end-location, is caused to determine said start-location based on the distance the consumer is predicted to cover along the predetermined path in the predetermined running time with the consumer travelling at said determined real-world speed.

In one or more examples, the spatial audio arrangement comprises a plurality of spatial audio objects each having a different spatial audio object location, the spatial audio object locations defined by one or more of:
  a) with reference to one or more other of the plurality of spatial audio object locations;
  b) with reference to a real-world geographic location;
  c) with reference to a location along a predetermined path to which said consumer is restricted to travel; and
  d) a location relative to the consumer;
wherein at least one of the spatial audio object locations is defined relative to a real-world geographic location or said predetermined, real-world geographic location.

In one or more examples,
  i) the spatial audio location of at least one of the spatial audio objects comprises a moving spatial audio location that changes location with time during the predetermined running time; and
  ii) the at least one of the spatial audio objects is associated with a point-of-interest geographic location; and
  wherein based on the apparatus starting the presentation at the start-location such that at a predetermined alignment-time during the predetermined running time, the location of the moving spatial audio location is predicted to be in the direction of the point-of-interest geographic location based on the consumer being at a predicted alignment-time location based on said determined real-world speed and the predetermined alignment-time; and
  based on a determination that a reported location of the consumer is more than a threshold distance from the predicted alignment-time location at the alignment-time, provide for modification of the location of the moving spatial audio location to align it with the point-of-interest geographic location relative to the consumer with respect to a determined current location of the consumer.

In one or more examples, the at least one spatial audio object location is configured to provide navigational guidance to the consumer to guide them to a point-of-interest geographical location audibly mentioned in the spatial audio content.

In one or more examples, said predetermined, real-world geographic location comprises one of:
  the point-of-interest geographical location; and
  an intersection for accessing said point-of-interest geographical location.

In one or more examples,
i) the spatial audio location of at least one of the spatial audio objects comprises a moving spatial audio location that changes location with time during the predetermined running time; and
ii) the at least one of the spatial audio objects is associated with a consumer-related-direction comprising a direction defined relative to the consumer; and
wherein based on the apparatus starting the presentation at the start-location such that at a predetermined alignment-time during the predetermined running time, the location of the moving spatial audio location is predicted to be in the consumer-related-direction based on the consumer being at a predicted alignment-time location based on said determined real-world speed and the predetermined alignment-time; and
based on a determination that a reported location of the consumer is more than a threshold distance from the predicted alignment-time location at the alignment-time, provide for modification of the location of the moving spatial audio location to align it with the consumer-related-direction with respect to the consumer.

In one or more examples, the apparatus is configured to provide for presentation of the augmented reality content to one of:
a) headphones;
b) an in-vehicle speaker arrangement.

In one or more examples, the augmented reality content includes visual content for visual presentation over the consumer's view of the real-world, said visual content of the augmented reality content configured to provide navigational guidance to the predetermined, real-world geographic location.

In a further aspect there is provided a vehicle including the apparatus of the first aspect and configured to present said augmented reality content via an in-vehicle speaker arrangement.

In a further aspect there is provided a method, the method comprising:
based on
(i) augmented reality content comprising at least spatial audio content and having a predetermined running time, said spatial audio content defining a spatial audio arrangement comprising at least one spatial audio object location, the or each spatial audio object location defining, at least in part, the configuration of the application of a spatial audio effect to be applied to said spatial audio content such that, when presented to a consumer of said augmented reality content, said spatial audio content is perceived as originating from said at least one spatial audio location,
(ii) a predetermined, real-world geographic location associated with at least one of said spatial audio location and said spatial audio arrangement; and
(iii) a determined real-world speed of said consumer;
providing for starting of the presentation of said augmented reality content based on a determination that the consumer has reached a start-location, said start-location comprising a location defined such that by starting said presentation at the start-location and with the consumer travelling at said determined real-world speed for the predetermined running time, the consumer is predicted to be at a determined end-location based on said predetermined, real-world geographic location.

In a further aspect there is provided a computer readable medium comprising computer program code stored thereon, the computer readable medium and computer program code being configured to, when run on at least one processor, perform the method of:
based on
(i) augmented reality content comprising at least spatial audio content and having a predetermined running time, said spatial audio content defining a spatial audio arrangement comprising at least one spatial audio object location, the or each spatial audio object location defining, at least in part, the configuration of the application of a spatial audio effect to be applied to said spatial audio content such that, when presented to a consumer of said augmented reality content, said spatial audio content is perceived as originating from said at least one spatial audio location,
(ii) a predetermined, real-world geographic location associated with at least one of said spatial audio location and said spatial audio arrangement; and
(iii) a determined real-world speed of said consumer;
providing for starting of the presentation of said augmented reality content based on a determination that the consumer has reached a start-location, said start-location comprising a location defined such that by starting said presentation at the start-location and with the consumer travelling at said determined real-world speed for the predetermined running time, the consumer is predicted to be at a determined end-location based on said predetermined, real-world geographic location.

In a further example aspect there is provided an apparatus comprising:
at least one processor; and
at least one memory including computer program code,
the at least one memory and the computer program code configured to, with the at least one processor, cause the apparatus to perform at least the following:
based on
(i) augmented reality content comprising at least spatial audio content and having a predetermined running time, said spatial audio content defining a spatial audio arrangement comprising at least one spatial audio object location, the or each spatial audio object location defining, at least in part, the configuration of the application of a spatial audio effect to be applied to said spatial audio content such that, when presented to a consumer of said augmented reality content, said spatial audio content is perceived as originating from said at least one spatial audio location,
(ii) a predetermined, real-world geographic location associated with at least one of said spatial audio location and said spatial audio arrangement; and
(iii) a determined real-world speed of said consumer;
provide for starting of the presentation of said augmented reality content based on a determination that the consumer has reached a start-location, said start-location comprising a location defined such that by starting said presentation at the start-location and with the consumer travelling at said determined real-world speed for the predetermined running time, the consumer is predicted to be at a determined end-location based on said predetermined, real-world geographic location.

The present disclosure includes one or more corresponding aspects, examples or features in isolation or in various combinations whether or not specifically stated (including claimed) in that combination or in isolation. Corresponding means and corresponding functional units (e.g., function enabler, AR/VR graphic renderer, display device) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

Augmented reality (AR) may use an AR display, such as glasses or goggles or a virtual retinal display, to augment a view of the real world (such as seen through the glasses or goggles) with computer generated content. An augmented reality apparatus, which may or may not include an AR display, may provide for presentation of multimedia AR content configured to be overlaid over the user's view of the real-world. Thus, a user of augmented reality may be able to view the real-world environment around them, which is augmented or supplemented with content provided to the augmented reality apparatus, which may be overlaid on their view of the real-world and/or aurally overlaid over an aural real-world scene they can hear. The AR apparatus may use a three-dimensional virtual space which is aligned with the real-world to position the augmented reality visual and/or audio content. The content may comprise multimedia content such as pictures, photographs, video, diagrams, textual information, aural content among others. Thus, while augmented reality may provide for direct viewing of the real world with the addition of computer generated graphics and/or audio content, a user of virtual reality may only be able to see content presented on a virtual reality display of a virtual reality apparatus substantially without direct viewing of the real world.

The augmented reality content may be configured and presented such that a consumer may be free to change their viewing or listening direction and location with respect to the augmented reality content provided for presentation around them. In so called six degrees of freedom (6DoF) augmented reality, the AR content and AR apparatus presenting said AR content may enable consumption of the AR content from arbitrary locations and from arbitrary directions. Accordingly, the consumer may be free to explore the real-world space and be free to view or listen to the AR content from any location or direction. Thus, in 6DoF AR the consumer may be free to look in different directions by modification of their viewing direction and also free to change their viewing location (e.g. their virtual location in the virtual space) by translation along any one of orthogonal x, y and z axes. The movement available in a 6DoF AR virtual space may be divided into two categories: rotational and translational movement (with three degrees of freedom each). Rotational movement enables a user to turn their head to change their viewing direction. The three rotational movements are around x-axis (roll), around y-axis (pitch), and around z-axis (yaw). Translational movement means that the user may also change their point of view in the space to view the AR virtual space from a different virtual location, i.e., move along the x, y, and z axes according to their wishes. The translational movements may be referred to as surge (x), sway (y), and heave (z) using the terms derived from ship motions.

Mixed reality is similar to augmented reality and may be considered to be a type of augmented reality. Mixed reality uses a three-dimensional model of the real-world environment to enable virtual objects to appear to interact with real-world objects in terms of one or more of their movement and appearance.

Spatial audio comprises audio presented in such a way to a user that it is perceived to originate from a particular location, as if the source of the audio was located at that particular location. Thus, augmented reality content is typically provided with spatial audio having such directional properties, such that the audio can be made to be perceived to originate from a point in real-world, which may be linked to visual imagery of the AR content. In augmented or mixed reality content, spatial audio may be provided such that the spatial audio is perceived as originating from real-world objects visible to the user and/or from augmented reality graphics overlaid over the user's view.

Spatial audio may be presented independently of visual augmented reality content. Spatial audio, in some examples, may be considered to be augmented reality content because it augments the aural scene perceived by a user. As an example of independent presentation of spatial audio, a user may wear headphones and, as they explore the real world, they may be presented with spatial audio such that the audio appears to originate at particular locations associated with real world objects or locations. For example, a city tour could be provided by a device that tracks the location of the user in the city and presents audio describing points of interest as spatial audio such that the audio is perceived to originate from the point of interest around the user's location. One or more of the embodiments described herein may present spatial audio.

The spatial positioning of the spatial audio may be provided by 3D audio effects, such as those that utilise a head related transfer function to create a spatial audio space (aligned with a real-world space in the case of augmented reality) in which audio can be positioned for presentation to a user. Spatial audio may be presented by headphones by using head-related-transfer-function (HRTF) filtering techniques or, for loudspeakers, by using vector-base-amplitude panning techniques to position the perceived aural origin of the audio content. In other embodiments ambisonic audio presentation may be used to present spatial audio. Spatial audio may use one or more of volume differences, timing differences and pitch differences between audible presentation to each of a user's ears to create the perception that the origin of the audio is at a particular location in space. The perceived distance to audio may be rendered by controlling the amount of reverberation and gain to indicate closeness or distance from the perceived source of the spatial audio.

In one or more examples, augmented reality content may be effective at alerting or informing a consumer who is travelling along a route. In one or more examples, augmented reality content and, in particular, augmented reality content that includes spatial audio content may be presented to a user to provide navigational guidance to a destination, such as the ultimate, intended destination of a consumer or a potential destination that the consumer may wish to stop at.

Figure 1:
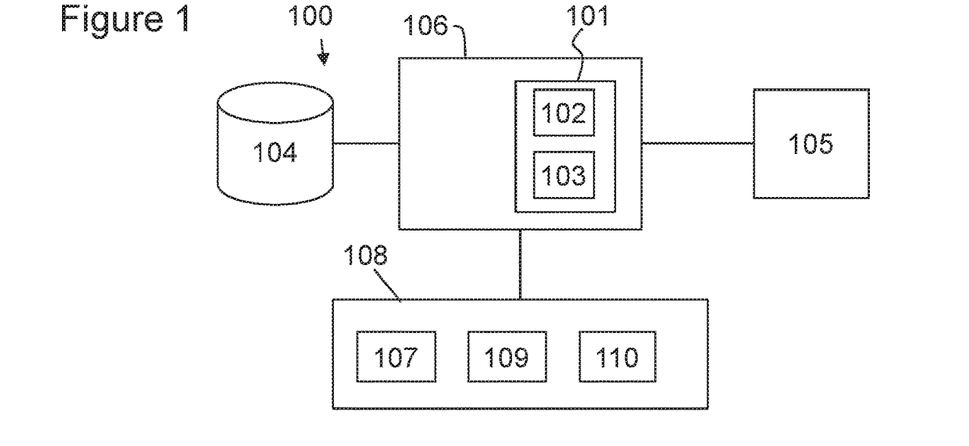
FIG. 1 illustrates an example apparatus for providing for presentation of context volume and communication between users.

FIG. 1 shows an example system 100 for presentation of augmented reality content. The system 100 includes an example apparatus 101 for providing for presentation of the augmented reality content at a specific time or location based on the geographic location of the consumer, as will be explained below.

The apparatus 101 may comprise or be connected to a processor 102 and a memory 103 and may be configured to execute computer program code. The apparatus 101 may have only one processor 102 and one memory 103 but it will be appreciated that other embodiments may utilise more than one processor and/or more than one memory (e.g. same or different processor/memory types). Further, the apparatus 101 may be an Application Specific Integrated Circuit (ASIC).

The processor may be a general purpose processor dedicated to executing/processing information received from other components, such as from an augmented reality content store 104 and a geographic location positioning device 105 configured to provide position information for the consumer, in accordance with instructions stored in the form of computer program code in the memory. The output signalling generated by such operations of the processor is provided onwards to further components, such as to an augmented reality presentation apparatus 106.

The memory 103 (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood, in one or more example embodiments, to provide an active coupling between the processor and the memory to allow the processor to access the computer program code stored on the memory.

In this example, the respective processors and memories are electrically connected to one another internally to allow for electrical communication between the respective components. In this example, the components are all located proximate to one another so as to be formed together as an ASIC, in other words, so as to be integrated together as a single chip/circuit that can be installed into an electronic device. In some examples one or more or all of the components may be located separately from one another.

The apparatus 101, in this example, forms part of the augmented reality apparatus 106. The apparatus 101 may provide signalling to the AR apparatus 106 to control the presentation of the augmented reality content. The apparatus 101 may provide for modification of the augmented reality content based on information indicative of the consumer's speed and their current geographic location. The consumer's speed may be provided to the apparatus 101 by the geographic location positioning device 105 or a different sensor.

In one or more examples, the AR apparatus 106 provide for presentation of the augmented reality content comprising at least spatial audio content using headphones 107 or other audio presentation apparatus.

The headphones 107 in one or more examples form part of a presentation device 108 which, in this example, may comprise AR glasses. Accordingly, the glasses may include a visual imagery display device 109. In one or more examples, a head orientation sensor 110 is also provided with the presentation device 108 such that head movement can be taken account of when presenting spatial audio from locations that are not defined relative to the user.

The AR apparatus 108 under the control of the apparatus 101, may provide for audible presentation of spatial audio content of augmented reality content from store 104. In one or more examples, the augmented reality apparatus is configured to provide augmented reality content which may provide for guidance to a point-of-interest. In particular, the direction from which the spatial audio is heard may, at least in part, provide for navigational guidance to a consumer of said augmented reality content. The store 104 may be a local storage device or may be a one or more remote storage devices, accessed via a communications network, such as the internet. The selection of the augmented reality content from the store may be based on geographic location information from the geographic location positioning device 105 and thereby relate to upcoming points-of-interest on a route for which a navigation device is providing guidance or on an assumed route or may be based on a user's proximity to a point-of-interest.

Figure 2:
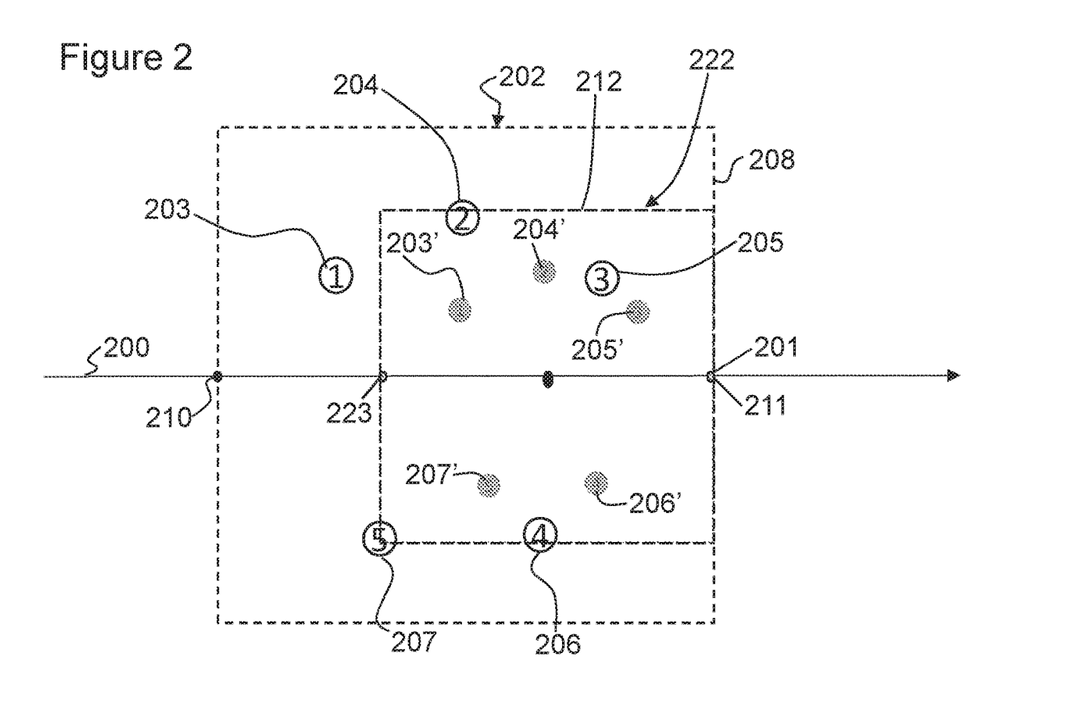
FIG. 2 shows an example spatial audio arrangement and how it may be scaled.

FIG. 2 shows an example route 200 along which a consumer is expected to travel based on their current heading, for example. The route 200 includes a predetermined, real-world geographic location 201, which may be accessible therefrom. The apparatus may be configured to determine, using one or more of the consumer's heading and map information, a likelihood of the consumer reaching the predetermined, real-world geographic location 201 for preparing for the presentation of augmented reality content. Augmented reality content may be available that is associated with said predetermined, real-world geographic location 201. Accordingly, the apparatus 101 may provide for selection of said augmented reality content. In one or more examples, the augmented reality content may provide information about a point-of-interest which may be at or accessible via the predetermined, real-world geographic location 201. The augmented reality content may have a finite duration comprising a predetermined running time.

The augmented reality content in the examples that follow comprises spatial audio content comprising audio that is defined such that when played back the spatial audio is perceived to be heard from one or more spatial audio object locations. The spatial audio object locations may be configured to align with real-world objects along the route 200 or may be defined to be heard from a specific direction relative to the consumer. In general, the spatial audio object locations may be defined by one or more of:

a) with reference to one or more other of a plurality of spatial audio object locations;
b) with reference to a real-world geographic location;
c) with reference to a location along a predetermined path to which said consumer is restricted to travel; and
d) a location relative to the consumer.

In summary, the spatial audio content defines a spatial audio arrangement comprising one or more spatial audio object locations that define where the audio associated with the locations will be heard from. Accordingly, the or each spatial audio object location defines, at least in part, the configuration of the application of a spatial audio effect to be applied to said spatial audio content such that, when presented to the consumer of said augmented reality content, said spatial audio content is perceived as originating from said spatial audio location.

Given the spatial audio content has a predetermined running time and, in one or more examples, the directional nature of the spatial audio defined therein may provide navigational guidance, it is desirable that the augmented reality content is presented accurately relative to the route 200. Thus, if the consumer is travelling faster than expected, the spatial audio content may reach the end of the running time after the consumer has traveled past the point-of-interest. If the consumer is travelling slower than expected, the spatial audio content may reach the end of the running time before the consumer has reached the point-of-interest and thus any guidance provided by the spatial audio content itself and/or the location of the spatial audio object locations may be confusing (because the perceived spatial origin of the audio provides guidance so that the consumer can travel towards the perceived source of the audio).

FIG. 2 shows a spatial audio arrangement 202 comprising spatial audio content associated with five spatial audio object locations 203-207. Different spatial audio content may be configured to be perceived originating from each of the locations 203-207. The spatial audio associated with the locations may be presented simultaneously, in groups or sequentially, as appropriate for the content.

The predetermined, real-world geographic location 201 may be associated with at least one of said spatial audio locations 203-207 and said spatial audio arrangement 202. In this example, the real-world geographic location 201 is associated with the spatial audio arrangement 202 and is located on its boundary 208. FIG. 2 also shows a scaled version 222 of the spatial audio arrangement 202, which is described in more detail below, and has a boundary 212. The real-world geographic location 201 is associated with the spatial audio arrangement 222 and is located on its boundary 212.

Accordingly, based on the above-described augmented reality content and a determined real-world speed of said consumer, such as from geographic location positioning device 105, the apparatus is configured to provide for starting of the presentation of said augmented reality content so that it reaches the end of its running time at a location based on the predetermined, real-world geographic location 201 that the consumer is predicted to be at given the speed of travel. The augmented reality content may therefore, despite being presented to a moving consumer, be effective at providing route guidance or providing the consumer with information relevant to their geographic location so they can decide to travel towards or appreciate the point-of-interest at a time such as when the augmented reality content has completed playback.

Accordingly, the apparatus 101 is caused to provide for starting of the presentation of said augmented reality content based on a determination that the consumer has reached a start-location 210, said start-location comprising a location defined such that by starting said presentation at the start-location 210 and following said predetermined running time with the consumer travelling at said determined real-world speed, the consumer is predicted to be at a determined end-location 211 based on said predetermined, real-world geographic location 201. In this example, the determined end-location 211 is said predetermined, real-world geographic location 201, but this need not be the case in all examples.

Accordingly, the apparatus 101 may assume that consumer will travel at the determined real-world speed, at least on average, over the predetermined running time. Accordingly, the apparatus 101 may effectively present said augmented reality content with, perhaps, one or more of the spatial audio object locations substantially aligned with real-world locations as intended by the augmented reality content producer.

Example FIG. 2 shows the spatial audio arrangement 202 comprising at least a two-dimensional region having the boundary 208. In one or more examples, the spatial audio arrangement comprises a three-dimensional volume within which at least some of the spatial audio objects are located. The volume may be considered to be an augmented reality volume within which the augmented reality content is experienced by the consumer. Thus, in one or more examples, said start-location 210 and said end-location 211 are on opposed sides of said boundary 208.

In one or more examples, the determination of the start-location 210 based on a desired end-location 211 related to the location 201 provides for scaling of the size of at least one dimension of the spatial audio arrangement 202 by a factor based on the determined speed and said predetermined running time. In the example figures the arrangement 202 is scaled over two-dimensions (length and width) but given the arrangement may be a 3D volume, it may be scaled over three dimensions (length, width and height). The spatial audio arrangement 202 shows the arrangement scaled based on an example speed of 100 km/hour and a running time of 20 seconds such that the start-location 210 is positioned 555.6 metres from the end-location.

Example FIG. 2 also shows the same spatial audio arrangement but scaled by a different factor at 222. The spatial audio arrangement 222 shows the same spatial audio object locations (labelled 203' to 207') arranged in the same positions relative to one another but with a separation that is scaled based on the factor. The spatial audio arrangement 222 shows the arrangement scaled based on an example speed of 60 km/hour and a running time of 20 seconds such that the start-location 223 is positioned 333.3 metres from the end-location 211.

The scaling of the spatial audio arrangement may provide for more faithful reproduction of the relative spatial arrangement of the spatial audio content despite the consumer's potentially travelling at different speeds on approach to the predetermined geographic location 201.

In one or more examples, the scaling of the arrangement 202 with speed may result in the spatial audio from the spatial audio locations 203-207 being presented more quietly, as they will be located further from the consumer compared to the smaller scaled arrangement 222. In one or more examples, the apparatus 101 may be caused to apply an audio-volume-function to the spatial audio to increase the volume based on the scaling or to increase the volume only if the spatial audio would be presented more quietly than a threshold minimum volume given its scaled location relative to the consumer.

The boundary 208, 212 of the spatial audio arrangement 202, 222 may be used by the apparatus 101 to determine when to begin presentation of the augmented reality content. In one or more examples, the starting of the presentation of said augmented reality content is based on determination of a boundary traversal event comprising said consumer entering said region at said start-location from outside said region. Accordingly, the apparatus may receive information indicative of the consumer's speed as they approach within a threshold distance of the predetermined location 201. The apparatus 101 may then provide for determination of the start-location 210 and provide for the scaling of the spatial audio arrangement 202. The apparatus 101 may then, based on information indicative of the current location of the consumer, await a trigger for starting presentation of the spatial audio content. Thus, in one or more examples, the trigger may be provided by the consumer crossing the boundary 208, 212. Thus, the starting of the presentation of said augmented reality content may be based on determination of a boundary traversal event comprising said consumer entering said region at said start-location 210, 223 from outside said region 202, 222.

In the example of FIG. 2, the predetermined, real-world geographic location 201 marked the location of the point-of-interest geographical location, which was the subject of the spatial audio content. However, in other examples, the predetermined, real-world geographic location 201 may mark an intersection or access point, such as a driveway, for accessing said point-of-interest geographical location. Further, in example FIG. 2, the end-location 211, comprising the geographic location at which the augmented reality content should reach the end of its running time was co-located with the predetermined, real-world geographic location 201.

Figure 3:
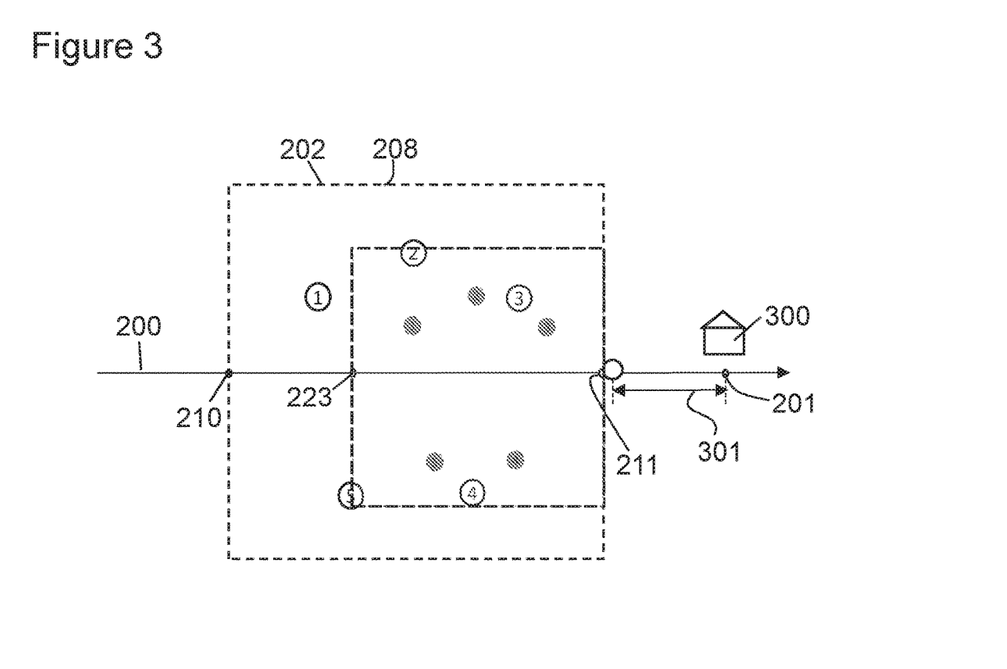
FIG. 3 shows an example in which the determined end-position is spaced from the predetermined geographic location.

In the example of FIG. 3, the end-location 211 is not co-located with the predetermined, real-world geographic location 201. FIG. 3 is substantially similar to FIG. 2 and the same reference numerals have been applied. In this and other examples, the predetermined, real-world geographic location 201 may designate the location of a point-of-interest 300. The determined end-location 211 may be position ahead of the predetermined, real-world geographic location 201 to provide a reaction time to enable the consumer to understand and react to the information or navigational guidance provided by the augmented reality content. Accordingly, the consumer may decide to drive their vehicle to the point-of-interest 300 and may require the reaction time to decide and apply the brakes or make a turn signal and turn.

The distance the determined end-location 211 is ahead of the predetermined, real-world geographic location 201 may be related to the determined speed of the consumer. If the consumer is travelling more quickly, then a greater distance 301 may be required in which to react compared to if the consumer was travelling more slowly. Thus, in one or more examples, said determined end location 211 comprises a location based on said real-world geographic location 201 and said determined real-world speed.

Figure 4:
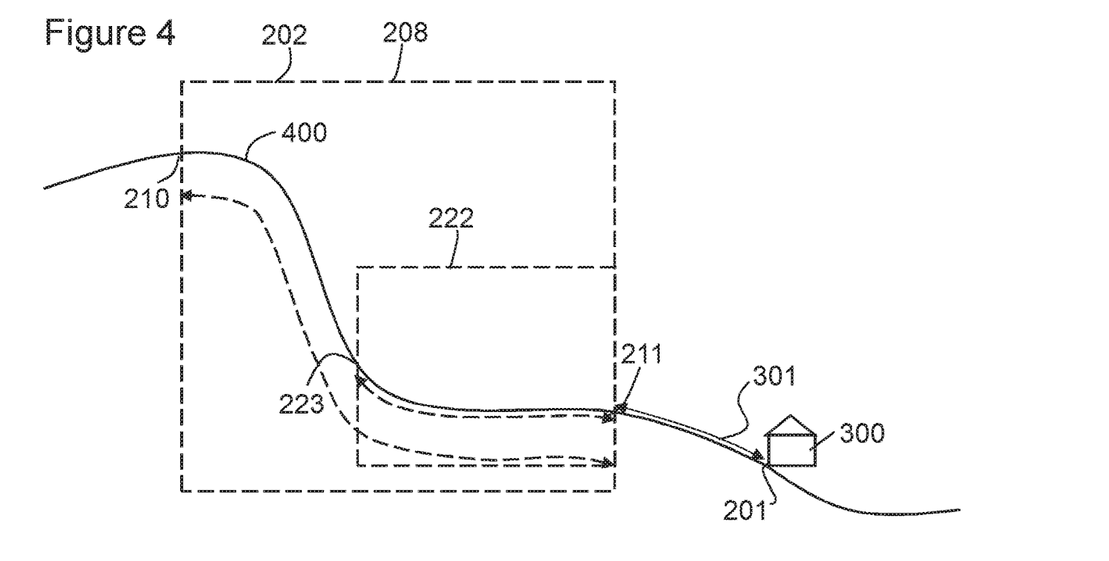
FIG. 4 shows an example route traversing said spatial audio arrangement.

FIGS. 2 and 3 may be considered to illustrate the route 200 as a straight line between the start-location 210, 223 and the end-location 211. However, it will be appreciated that said route may not be straight. Example FIG. 4 illustrates an example route 400 comprising a path, such as a road or street (or any other vehicle or pedestrian traversable travel path), that follows a series of bends through the spatial audio arrangement 202, 222. Example FIG. 4 is, in other respects, similar to FIG. 3 and therefore the same reference numerals have been used for like features.

Thus, when said consumer is restricted to travel along a predetermined path from the start-location 210, 223 to the end-location 211 the apparatus 101, based on map data defining the predetermined path, is caused to determine said start-location 210, 223 based on the distance the consumer is predicted to cover along the predetermined path in the predetermined running time with the consumer travelling at said determined real-world speed.

Figure 5:
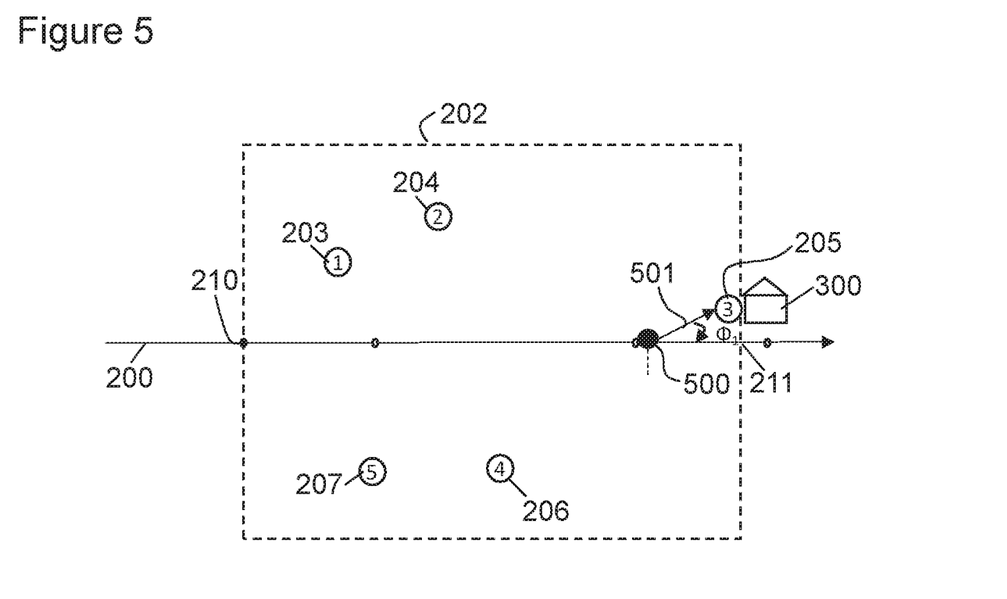
FIG. 5 shows an example of using the direction from which spatial audio is heard to assist navigation.
Figure 6:
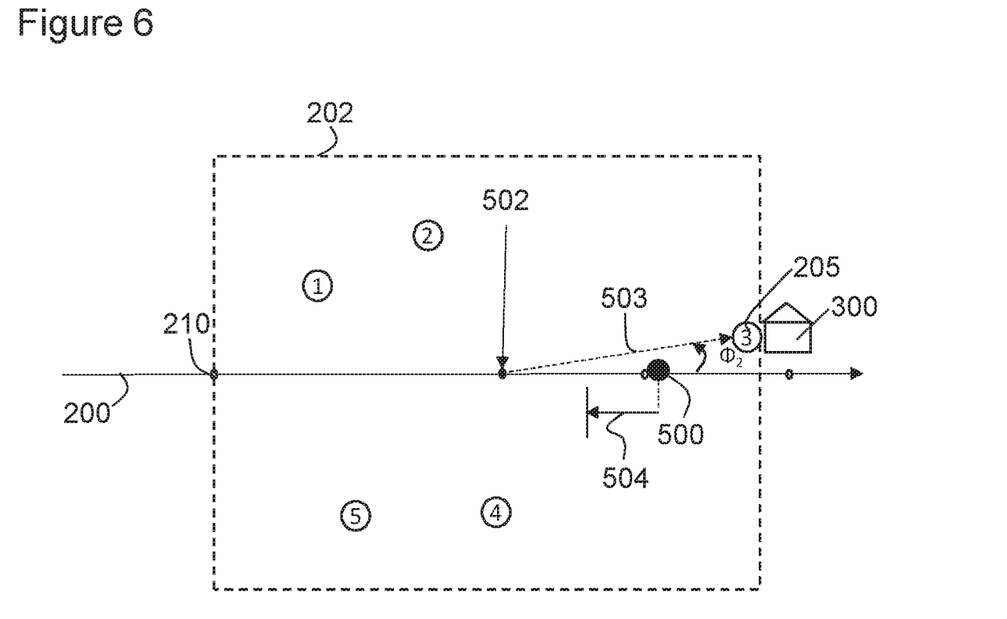
FIG. 6 shows an example based on the situation of FIG. 5 in which the consumer has unexpectedly stopped.

Example FIGS. 5 and 6 illustrate a further technical consideration when presenting spatial audio to a moving consumer. The spatial audio object locations 203-207 may, in one or more examples, be stationary relative to the real-world such that the user travels past them as they hear the audio content perceived to originate from the locations 203-207. In one or more other examples, one or more of the spatial audio locations may be in motion during presentation of the augmented reality content. Thus, the augmented reality content may define how the spatial audio object locations should move during presentation of the augmented reality content.

Accordingly, in the example illustrated in FIGS. 5 and 6:
 i) the spatial audio location of at least one of the spatial audio object locations 205 comprises a moving spatial audio location that changes location with time during the predetermined running time; and
 ii) the at least one of the spatial audio objects 205 is associated with the point-of-interest geographic location 300.

It may be desirable for the spatial audio from the spatial audio object locations 205 to be aligned with the point-of-interest location 300 at a particular point in time from the determined current location of and therefore the point of view of the consumer. While the point of view of the consumer at a particular time, once the arrangement 202 has been scaled and the start-location 210 set, may be determined, if the speed of the consumer varies while travelling through the spatial audio arrangement, the point of view of the consumer at the relevant time may not result in the alignment of the spatial audio location with the point-of-interest location 300, which may lead to confusion.

Example FIG. 5 shows the situation if the consumer maintains the determined speed. The consumer will reach a predicted alignment-time location 500 at an alignment-time and the perceived direction 501 towards the audio object location 205 will be aligned with the point-of-interest location 300, as intended. In this example, the audio object location 205 is in a direction $\Phi_1$ relative to the heading of the consumer. Thus, the predicted alignment-time location comprises a location between the start-location and the end-location that the consumer is expected to reach at a predetermined time during the predetermined running time.

Example FIG. 6 illustrates the situation if the consumer does not maintain the determined speed nor averages the determined speed (at least up until the predicted alignment-time location 500). In FIG. 6, the consumer makes an unplanned stop at location 502 along the route, perhaps due to traffic conditions. It will be appreciated that any deviation from the determined speed that causes a change in the average speed through at least part of the arrangement 202 up until the predicted alignment-time location 500 may be problematic. Accordingly, at the alignment-time, the consumer is not at the predicted alignment-time location 500 and is instead at location 502. Accordingly, the direction 501 from which the audio associated with the audio object location 205 is presented must be modified from direction $\Phi_1$ relative to the heading of the consumer to a direction $\Phi_2$, labelled 503, relative to the heading of the consumer.

Thus, in summary, based on the apparatus 101 starting the presentation of the augmented reality content at the start-location 210 such that at a predetermined alignment-time during the predetermined running time, the location of the moving spatial audio location 205 is predicted to be in the direction of the point-of-interest geographic location 300 based on the consumer being at a predicted alignment-time location 500 based on said determined real-world speed and the predetermined alignment-time; and     based on a determination that the consumer is more than a threshold distance (504 for example) from the predicted alignment-time location 500 at the alignment-time, provide for modification of the location of the moving spatial audio location relative to the consumer to align it with the point-of-interest geographic location 300 with respect to a determined current location 502 of the consumer.

In one or more other examples:
i) the spatial audio of at least one of the spatial audio object locations 205 is defined such that it is not initially presented but, after a non-zero delayed-start-time period of the predetermined running time, it is provided for presentation; and
ii) the at least one of the spatial audio objects 205 is associated with the point-of-interest geographic location 300.

Similar to the previous example, in the event the consumer does not maintain the determined speed nor averages the determined speed (at least up until predicted alignment-time location based on the delayed-start-time period and the determined speed), then the spatial audio will be presented at the wrong time and may therefore not be able to accurately refer to the point-of-interest geographic location 300.

Accordingly, based on the apparatus 101 starting the presentation of the augmented reality content at the start-location 210 such that at a predetermined delayed-start-time period during the predetermined running time, the spatial audio associated with at least one spatial audio location is presented at a predicted alignment-time location based on said determined real-world speed and the predetermined delayed-start-time period; and     based on a determination that the consumer is or will be more than a threshold distance from the predicted alignment-time location after the predetermined delayed-start-time period, provide for modification of the predetermined delayed-start-time period to provide for presentation of said audio content to a time when there will be a desired spatial configuration with the point of interest geographic location with respect to a determined current location of the consumer.

Thus, the apparatus may provide for control of the delayed-start-time period so that the audio is presented when there is a desired spatial configuration, such as the user being able to see the point of interest geographic location at the time the audio is presented to them.

Figure 7:
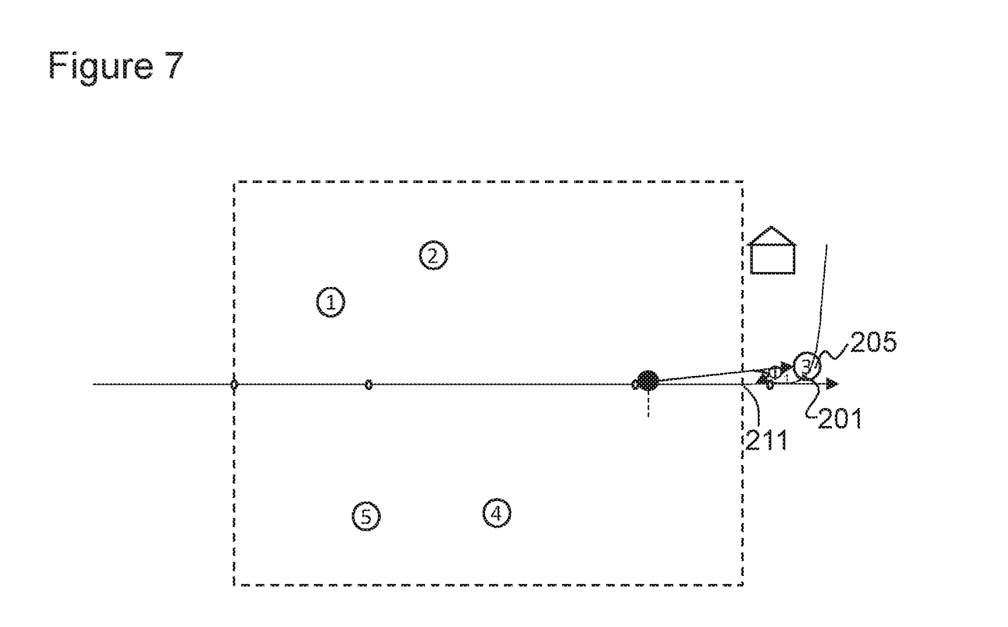
FIG. 7 shows the positioning of the predetermined geographical location at an intersection for accessing a point-of-interest.

Example FIG. 7 shows an example in which the location of at least one of the spatial audio objects 205 is assigned a geographic location. Further, FIG. 7 shows the predetermined, real-world geographic location 201 marking an intersection, such as a driveway, for accessing said point-of-interest geographical location 300 rather than marking said point-of-interest geographical location 300. The remainder of FIG. 7 is similar to previous figures and like reference numerals have been used.

Figure 8:
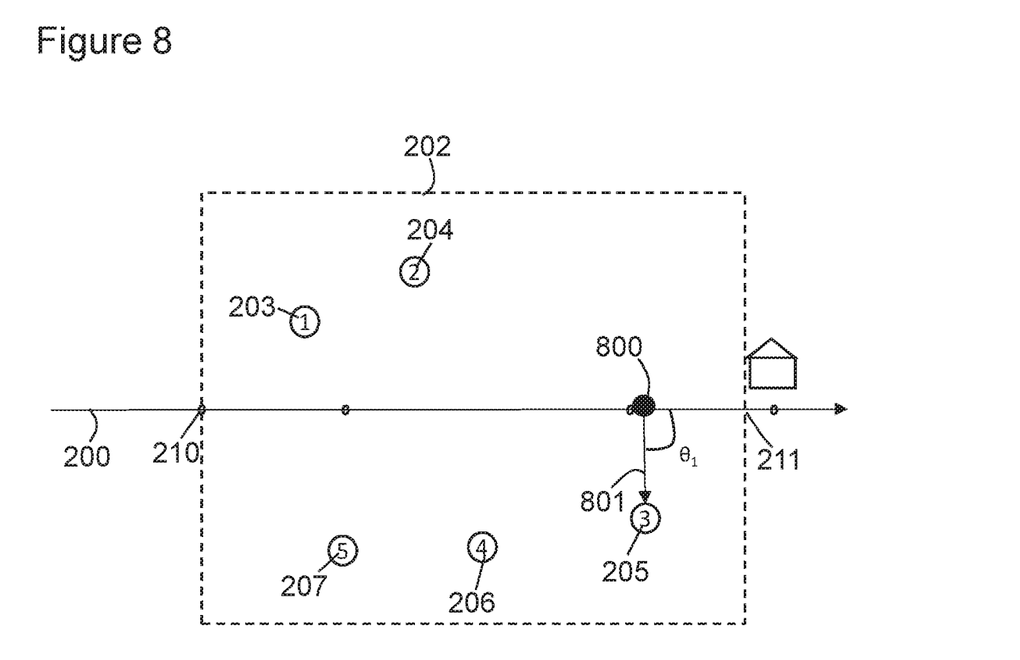
FIG. 8 shows a spatial audio location that is desired to be presented in a specific direction relative to the consumer.
Figure 9:
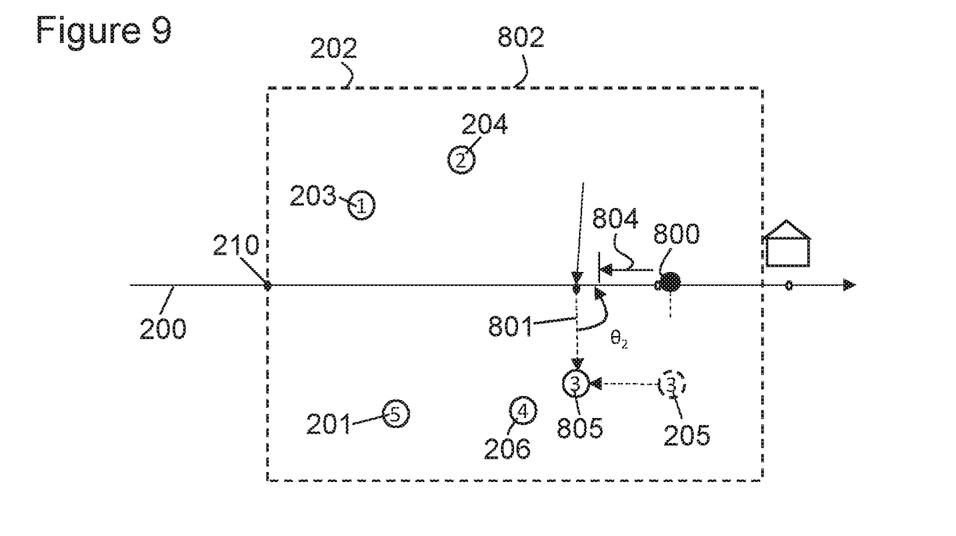
FIG. 9 shows an example based on the situation of FIG. 8 in which the consumer has unexpectedly stopped.

Example FIGS. 8 and 9 illustrate a further technical consideration when presenting spatial audio to a moving consumer. The spatial audio object locations 203-207 may, in one or more examples, be defined relative to the consumer rather than directly or indirectly relative to a real-world location. Accordingly, the spatial audio object location may have a consumer-related-direction comprising one that is defined as a direction or location from the current point of view of the user, at least at a particular point in time.

In example FIGS. 8 and 9:
i) the spatial audio location of at least one of the spatial audio objects 205 comprises a moving spatial audio location that changes location with time during the predetermined running time; and
ii) the at least one of the spatial audio objects 205 is associated with a consumer-related-direction 801 comprising a direction defined relative to the consumer.

Example FIG. 8 shows the situation if the consumer maintains the determined speed. The consumer will reach a predicted alignment-time location 800 at an alignment-time and the perceived direction 801 towards the audio object location 205 will be as defined in the augmented reality content, which, in this example comprises 90 degrees to the right of the consumer's heading.

Example FIG. 9 illustrates the situation if the consumer does not maintain the determined speed nor averages the determined speed (at least up until the predicted alignment-time location 800). In FIG. 9, the consumer makes an unplanned stop at location 802 along the route 200, perhaps due to traffic conditions. It will be appreciated that any deviation from the determined speed that causes a change in the average speed through at least part of the arrangement 202 up until the predicted alignment-time location 800 may be problematic. Accordingly, at the alignment-time, the consumer is not at the predicted alignment-time location 800 and is instead at location 802. Accordingly, the location of the spatial audio object 205 must be modified from the location shown at 205 to the location shown at 805.

Thus, in summary, based on the apparatus 101 starting the presentation at the start-location 210 such that at a predetermined alignment-time during the predetermined running time, the location of the moving spatial audio location is predicted to be in a consumer-related-direction 801 based on the consumer being at a predicted alignment-time location 800 based on said determined real-world speed and the predetermined alignment-time; and     based on a determination that the consumer is more than a threshold distance 804 from the predicted alignment-time location 800 at the alignment-time, provide for modification of the location of the moving spatial audio location 205 to align it with the consumer-related-direction 801 with respect to the consumer.

In the above examples, the apparatus 101 may be configured to provide for presentation of the augmented reality content to one of headphones 107 or, in-vehicle speaker arrangement. In other examples, any audio presentation apparatus capable of presenting spatial audio may be used.

The in-vehicle speaker arrangement may comprise an audio presentation system of a car, bus, lorry, train or any other mode of transport in which a consumer may wish to be informed or alerted about point-of-interest. In one or more examples, the augmented reality content may comprise information or advertisements that provide navigational guidance to a predetermined geographic location.

In the above examples, the augmented reality content is only described as comprising spatial audio content. However, in one or more examples, the augmented reality content may further comprise visual imagery content. Accordingly, the apparatus may provide for display of visual content for visual presentation over the consumer's view of the real-world, said visual content of the augmented reality content, in one or more examples, configured to provide navigational guidance to the predetermined, real-world geographic location.

In one or more examples, the speed at which a consumer travels may affect which of a plurality of augmented reality content is presented to them. For example, a cyclist may be provided with different augmented reality content to a car driver. The augmented reality content may be speed specific to thereby provide safer, non-distracting or, in general, augmented reality content appropriate to the consumer's speed. Accordingly, the apparatus 101, based on the determined speed of the consumer, may provide for selection of the augmented reality content to present thereto.

In one or more examples, the apparatus 101 is configured to provide for downloading of augmented reality content from a server based on the consumer arriving at a location within a threshold of the predetermined real-world geographic location. In one or more examples, the apparatus 101 is, based on a predetermined route, configured to provide for downloading of augmented reality content from a server in advance of the consumer arriving at a location within a threshold of the predetermined real-world geographic location. Further, the apparatus 101, on determination that the consumer is arriving at a location within a threshold of the predetermined real-world geographic location associated with pre-downloaded augmented reality content, may download any updates to said augmented reality content. Thus, as an example, the augmented reality content may provide the consumer with information about the layout, taxi locations, exit barriers of an upcoming train station from the expected arrival platform. This content may be downloaded based on a determination that the train will travel through said station. However, on arrival to the station, an update of the platform number may be received (more generally, update-to-augmented-reality-content information) and, accordingly, only an update to the augmented reality content may be received rather than all of the content. In one or more examples, the apparatus 101 may provide for, based on preview-request user input, previewing of the augmented reality content in advance of the consumer reaching the start-location.

Figure 10:
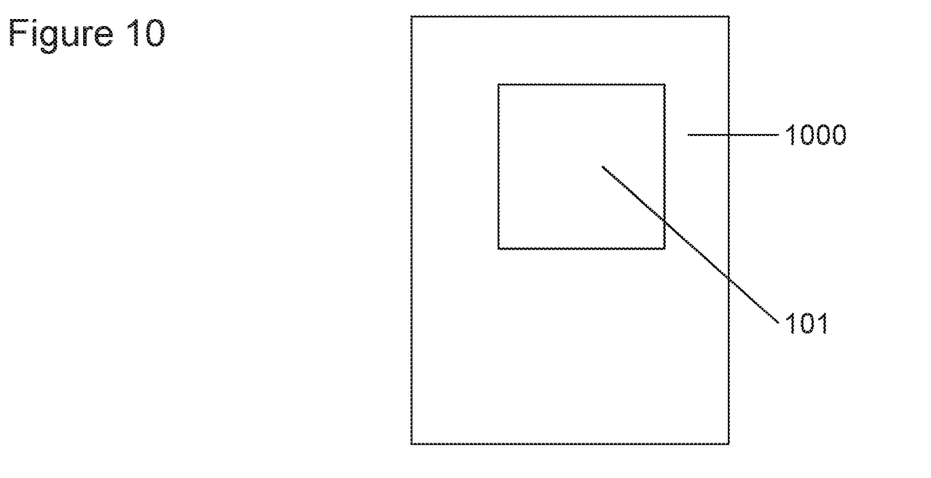
FIG. 10 shows an example vehicle.

FIG. 10 shows a vehicle 1000 including the apparatus 101 configured to present said augmented reality content via an in-vehicle speaker arrangement (not shown).

Figures 11, 12:
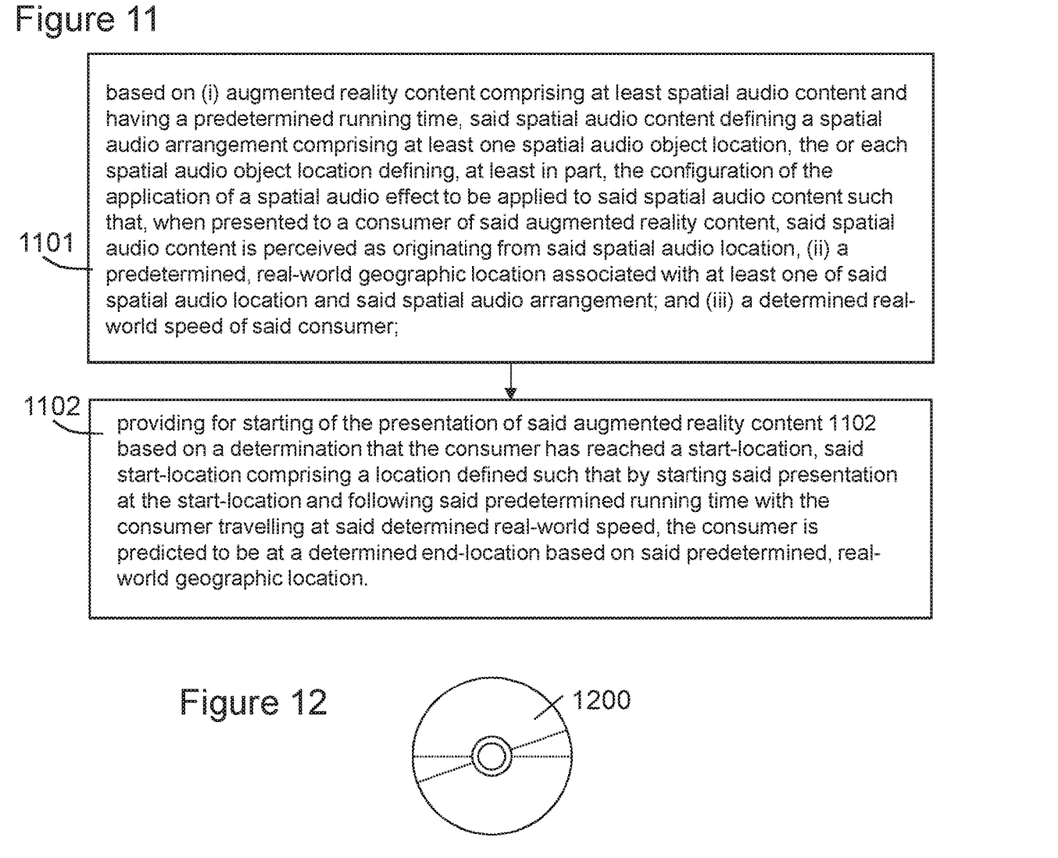
FIG. 11 shows a flowchart illustrating an example method.
FIG. 12 shows a computer readable medium.

FIG. 11 shows a flow diagram illustrating the steps of, based on 1101
(i) augmented reality content comprising at least spatial audio content and having a predetermined running time, said spatial audio content defining a spatial audio arrangement comprising at least one spatial audio object location, the or each spatial audio object location defining, at least in part, the configuration of the application of a spatial audio effect to be applied to said spatial audio content such that, when presented to a consumer of said augmented reality content, said spatial audio content is perceived as originating from said spatial audio location,
(ii) a predetermined, real-world geographic location associated with at least one of said spatial audio location and said spatial audio arrangement; and
(iii) a determined real-world speed of said consumer; providing for starting of the presentation of said augmented reality content 1102 based on a determination that the consumer has reached a start-location, said start-location comprising a location defined such that by starting said presentation at the start-location and following said predetermined running time with the consumer travelling at said determined real-world speed, the consumer is predicted to be at a determined end-location based on said predetermined, real-world geographic location.

FIG. 12 illustrates schematically a computer/processor readable medium 1000 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
at least one processor; and
at least one memory comprising computer program code,
the at least one memory and the computer program code configured to, with
the at least one processor, cause the apparatus to perform at least the following:
receive an indication of augmented reality content comprising at least spatial audio content and having a predetermined running time, said spatial audio content defining a spatial audio arrangement comprising at least one spatial audio object location, a respective spatial audio object location defining, at least in part, a configuration of a spatial audio effect to be applied to said spatial audio content such that, when presented to a consumer of said augmented reality content, said spatial audio content is perceived as originating from said at least one spatial audio location,
receive an indication of a predetermined, real-world geographic location associated with at least one of said spatial audio location and said spatial audio arrangement; and
receive an indication of a determined real-world speed of said consumer;
determine that the consumer has reached a start-location, said start-location comprising a location defined such that by starting presentation of the augmented reality content at the start-location and with the consumer travelling at said determined real-world speed for the predetermined running time, the consumer is predicted to be at a determined end-location based on said predetermined, real-world geographic location;
receive an indication of a moving spatial audio location that changes location with time during the predetermined running time, and has a positional association with a point-of-interest geographic location such that the location of the moving spatial audio location is predicted to be in the direction of the point-of-interest geographic location based on the consumer being at a predicted alignment-time location based on said determined real-world speed and a predetermined alignment-time;
determine that a reported location of the consumer is (a) equal to, or (b) equal to or more than a threshold distance from the predicted alignment-time location at the predetermined alignment-time; and
in response to determining that the reported location of the consumer is (a) equal to, or (b) equal to or more than a threshold distance from the predicted alignment-time location at the predetermined alignment-time, modify the location of the moving spatial audio location to align the moving spatial audio location with the point-of-interest geographic location relative to the consumer with respect to a determined updated location of the consumer.

2. An apparatus according to claim 1, wherein said determined end location comprises a location based on said real-world geographic location and said determined real-world speed.

3. An apparatus according to claim 1, wherein said spatial audio arrangement comprises at least a two-dimensional region having a boundary, said start-location and said end-location located on said boundary, wherein the determination of the location of the start-location provides for scaling of a size of at least one dimension of the spatial audio arrangement by a factor based on the determined speed and said predetermined running time.

4. An apparatus according to claim 3, wherein the starting of the presentation of said augmented reality content is based on determination of the occurrence of a boundary traversal event comprising when said consumer enters said region at said start-location from outside said region.

5. An apparatus according to claim 1, wherein the apparatus, based on map data defining predetermined paths on which the consumer is expected to travel from the start-location to the end-location, is caused to determine said start-location based on a distance the consumer is predicted to cover along the predetermined path in the predetermined running time with the consumer travelling at said determined real-world speed.

6. An apparatus according to claim 1, wherein the spatial audio arrangement comprises a plurality of spatial audio objects having different spatial audio object locations, the spatial audio object locations defined by one or more of:
   with reference to one or more other of the plurality of spatial audio object locations;
   with reference to a real-world geographic location;
   with reference to a location along a predetermined path to which said consumer is restricted to travel; or
   a location relative to the consumer;
   wherein at least one of the spatial audio object locations is defined relative to a real-world geographic location or said predetermined, real-world geographic location.

7. An apparatus according to claim 1, wherein the at least one spatial audio object location is configured to provide navigational guidance to the consumer to guide them to a point-of-interest geographical location audibly mentioned in the spatial audio content.

8. An apparatus according to claim 7, wherein said predetermined, real-world geographic location comprises one of:
   the point-of-interest geographical location; or
   an intersection for accessing said point-of-interest geographical location.

9. An apparatus according to claim 1, wherein the apparatus is configured to provide for presentation of the augmented reality content to one of:
   headphones;
   an in-vehicle speaker arrangement.

10. An apparatus according to claim 1, wherein the augmented reality content includes visual content for visual presentation over the consumer's view of the real-world, said visual content of the augmented reality content configured to provide navigational guidance to the predetermined, real-world geographic location.

11. An apparatus according to claim 1, wherein the apparatus is attached to a vehicle and the apparatus is configured to present said augmented reality content via an in-vehicle speaker arrangement.

12. A method, the method comprising:
   receiving an indication of an augmented reality content comprising at least spatial audio content and having a predetermined running time, said spatial audio content defining a spatial audio arrangement comprising at least one spatial audio object location, a respective spatial audio object location defining, at least in part, a configuration of a spatial audio effect to be applied to said spatial audio content such that, when presented to a consumer of said augmented reality content, said spatial audio content is perceived as originating from said at least one spatial audio location,
   receiving an indication of a predetermined, real-world geographic location associated with at least one of said spatial audio location and said spatial audio arrangement;
   receiving an indication of a determined real-world speed of said consumer;
   that the consumer has reached a start-location, said start-location comprising a location defined such that by starting presentation of the augmented reality content at the start-location and with the consumer travelling at said determined real-world speed for the predetermined running time, the consumer is predicted to be at a determined end-location based on said predetermined, real-world geographic location;
   receiving an indication of a moving spatial audio location that changes location with time during the predetermined running time, and has a positional association with a point-of-interest geographic location such that the location of the moving spatial audio location is predicted to be in the direction of the point-of-interest geographic location based on the consumer being at a predicted alignment-time location based on said determined real-world speed and a predetermined alignment-time;
   determining that a reported location of the consumer is (a) equal to, or (b) equal to or more than a threshold distance from the predicted alignment-time location at the predetermined alignment-time; and
   in response to determining that the reported location of the consumer is (a) equal to, or (b) equal to or more than a threshold distance from the predicted alignment-time location at the predetermined alignment-time, modifying the location of the moving spatial audio location to align the moving spatial audio location with the point-of-interest geographic location relative to the consumer with respect to a determined updated location of the consumer.

13. A method according to claim 12, wherein said determined end location comprises a location based on said real-world geographic location and said determined real-world speed.

14. A method according to claim 12, wherein said spatial audio arrangement comprises at least a two-dimensional region having a boundary, said start-location and said end-location located on said boundary, wherein the determination of the location of the start-location provides for scaling of a size of at least one dimension of the spatial audio arrangement by a factor based on the determined speed and said predetermined running time.

15. A method according to claim 14, wherein the starting of the presentation of said augmented reality content is based on determination of the occurrence of a boundary traversal event comprising when said consumer enters said region at said start-location from outside said region.

16. A method according to claim 12, wherein the apparatus, based on map data defining predetermined paths on which the consumer is expected to travel from the start-location to the end-location, is caused to determine said start-location based on a distance the consumer is predicted to cover along the predetermined path in the predetermined running time with the consumer travelling at said determined real-world speed.

17. A method according to claim 12, wherein the spatial audio arrangement comprises a plurality of spatial audio objects having different spatial audio object locations, the spatial audio object locations defined by one or more of:

with reference to one or more other of the plurality of spatial audio object locations;

with reference to a real-world geographic location;

with reference to a location along a predetermined path to which said consumer is restricted to travel; or a location relative to the consumer;

wherein at least one of the spatial audio object locations is defined relative to a real-world geographic location or said predetermined, real-world geographic location.

18. A non-transitory computer readable medium comprising program instructions stored thereon for performing at least the following:

receive an indication of augmented reality content comprising at least spatial audio content and having a predetermined running time, said spatial audio content defining a spatial audio arrangement comprising at least one spatial audio object location, a respective spatial audio object location defining, at least in part, configuration of a spatial audio effect to be applied to said spatial audio content such that, when presented to a consumer of said augmented reality content, said spatial audio content is perceivable as originating from said at least one spatial audio location, receive an indication of a predetermined, real-world geographic location associated with at least one of said spatial audio location and said spatial audio arrangement; and receive an indication of a determined real-world speed of said consumer;

determine that the consumer has reached a start-location, said start-location comprising a location defined such that by starting presentation of the augmented reality content at the start-location and with the consumer travelling at said determined real-world speed for the predetermined running time, the consumer is predicted to be at a determined end-location based on said predetermined, real-world geographic location;

receive an indication of a moving spatial audio location that changes location with time during the predetermined running time, and has a positional association with a point-of-interest geographic location such that the location of the moving spatial audio location is predicted to be in the direction of the point-of-interest geographic location based on the consumer being at a predicted alignment-time location based on said determined real-world speed and a predetermined alignment-time;

determine that a reported location of the consumer is (a) equal to, or (b) equal to or more than a threshold distance from the predicted alignment-time location at the predetermined alignment-time; and in response to determining that the reported location of the consumer is (a) equal to, or (b) equal to or more than a threshold distance from the predicted alignment-time location at the predetermined alignment-time, modify the location of the moving spatial audio location to align the moving spatial audio location with the point-of-interest geographic location relative to the consumer with respect to a determined updated location of the consumer.

* * * * *